(12) United States Patent
Guo et al.

(10) Patent No.: US 7,738,476 B2
(45) Date of Patent: Jun. 15, 2010

(54) METHOD AND APPARATUS FOR IMPROVED MULTICAST STREAMING IN WIRELESS NETWORKS

(75) Inventors: Katherine H. Guo, Eatontown, NJ (US); Arun Narayen Netravali, Westfield, NJ (US); Krishnan K. Sabnani, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 856 days.

(21) Appl. No.: 11/396,269

(22) Filed: Mar. 31, 2006

(65) Prior Publication Data

US 2007/0230395 A1 Oct. 4, 2007

(51) Int. Cl.
*H04L 12/28* (2006.01)
(52) U.S. Cl. ...................... 370/431; 370/458
(58) Field of Classification Search .................. 370/338, 370/348, 395.4, 395.21, 428, 431, 442, 443
See application file for complete search history.

(56) References Cited

U.S. PATENT DOCUMENTS 6,850,499 B2 * 2/2005 Wheatley et al. ............ 370/328
7,164,890 B2 * 1/2007 Eriksson et al. ............... 455/69
7,406,098 B2 * 7/2008 Taneja et al. ................. 370/468
2004/0210619 A1 * 10/2004 Balachandran et al. ...... 709/200

* cited by examiner

Primary Examiner—Chirag G Shah
Assistant Examiner—Minh-Trang Nguyen
(74) Attorney, Agent, or Firm—Wall & Tong, LLP

(57) ABSTRACT

The invention includes a method and apparatus for scheduling packet transmissions on a data channel from a base transceiver station to a plurality of wireless terminals. The method includes, in response to detecting an available timeslot, computing utilization evaluation values for the respective media sub-streams using data rate feedback information from the wireless terminals and respective average data rates associated with respective media sub-streams, selecting one of the media sub-streams having an associated utilization evaluation value indicative of a best available channel utilization for the data channel, and transmitting a packet from the selected media sub-stream toward at least one wireless terminal belonging to a media sub-group associated with the selected media sub-stream. An average data rate associated with each media sub-stream is updated at each timeslot.

20 Claims, 7 Drawing Sheets

500

METHOD AND APPARATUS FOR IMPROVED MULTICAST STREAMING IN WIRELESS NETWORKS

FIELD OF THE INVENTION

The invention relates to the field of communication networks and, more specifically, to multicast streaming of multimedia content in wireless networks.

BACKGROUND OF THE INVENTION

To distribute streaming multimedia content to multiple mobile devices, service providers typically use the cost-effective broadcast multicast architecture of Third Generation (3G) wireless networks. Within a multicast group, mobile terminals are heterogeneous in terms of terminal capability and channel condition. In the absence of feedback information from the mobile terminals, in order to provide adequate cell coverage, existing data transmission scheduling schemes, assuming that there is always at least one mobile terminal located at the edge of the cell, use a fixed data rate in each time slot. Disadvantageously, although such data transmission scheduling schemes ensure adequate wireless coverage within the cell, data throughput of mobile terminals with good respective channel conditions (e.g., mobile terminals located close to the Base Transceiver Station) is limited.

SUMMARY OF THE INVENTION

Various deficiencies in the prior art are addressed through the invention of a method and apparatus for scheduling packet transmissions on a data channel from a base transceiver station to a plurality of wireless terminals. The method includes, in response to detecting an available timeslot, computing utilization evaluation values for the respective media sub-streams using data rate feedback information from the wireless terminals and respective average data rates associated with respective media sub-streams, selecting one of the media sub-streams having an associated utilization evaluation value indicative of a best available channel utilization for the data channel, and transmitting a packet from the selected media sub-stream toward at least one wireless terminal belonging to a media sub-group associated with the selected media sub-stream. An average data rate associated with each media sub-stream is updated at each timeslot.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
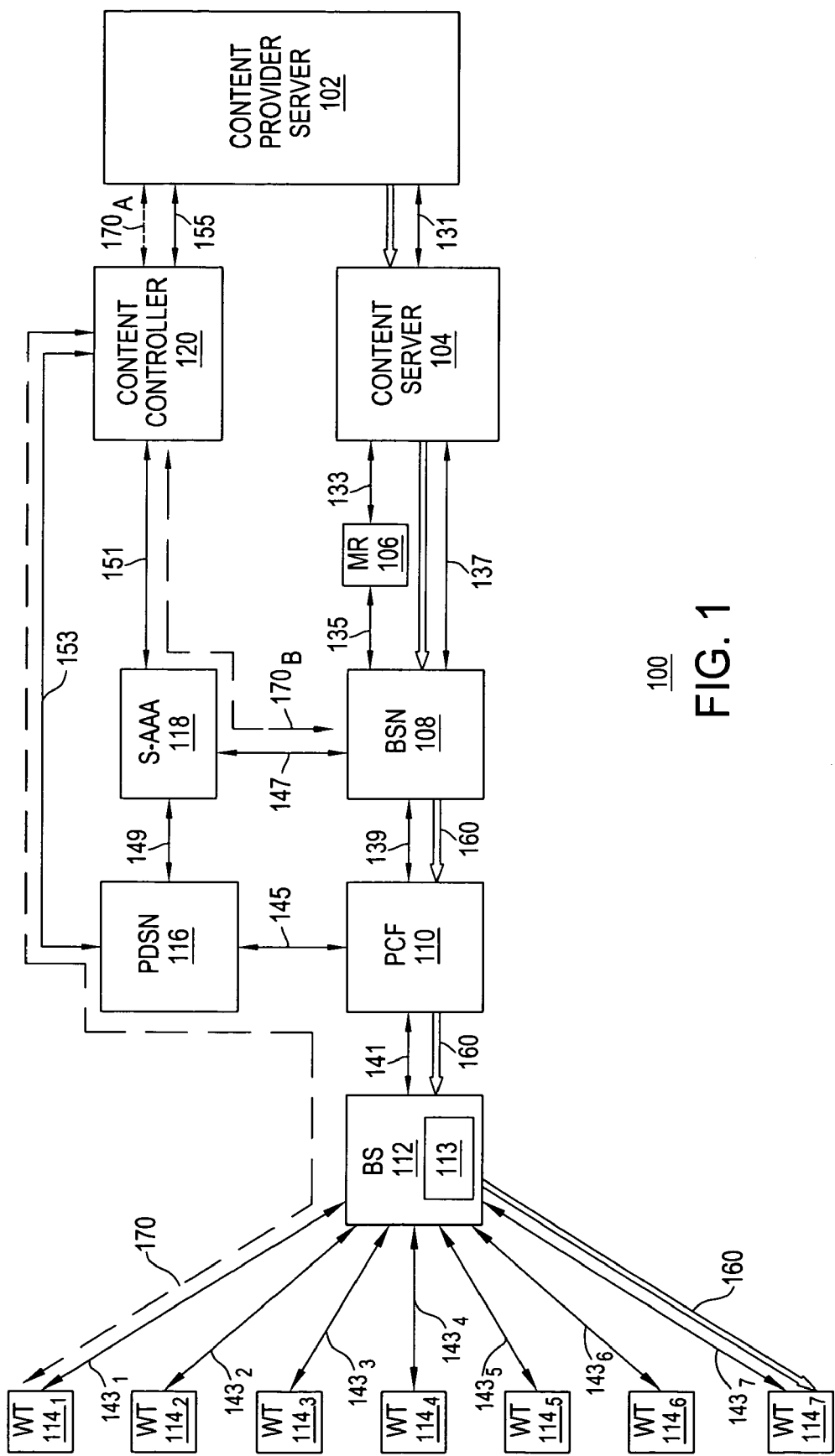
FIG. 1 depicts a high-level block diagram of logical components of a communication network.

The present invention improves data throughput for broadcast and multicast streams in wireless systems by varying media stream data rates using data rate feedback from wireless terminals. The present invention processes a media stream (media group) to form at least one media sub-stream (media sub-group), where a media sub-stream is formed for each base station serving at least one wireless terminal scheduled to receive the media stream. The media stream is associated with a respective media group which supports an associated multicast flow adapted for conveying the associated media stream. A media sub-stream is associated with a respective media sub-group which supports an associated multicast flow adapted for conveying the associated media sub-stream. The media sub-streams transport the same multimedia content transported by the media stream.

The present invention schedules transmission of packets over a data channel between a base station and the wireless terminals supported by the base station. The present invention schedules transmission of packets associated with different media sub-streams supported by each base station. In response to detecting that a timeslot is available for transmitting a packet, a base station selects one of the media sub-streams supported by that base station and transmits a packet for the selected media sub-stream using at least one timeslot. The present invention, at a base station supporting a plurality of media sub-streams, selects one of the supported media sub-streams having a utilization evaluation value indicative of the best available channel utilization for the data channel.

In one embodiment, the utilization evaluation value may be computed as a rate ratio. In one embodiment, the utilization evaluation value indicative of the best available channel utilization for the data channel is the largest utilization evaluation value (e.g., largest rate ratio). In one embodiment, the rate ratio may be computed for each media sub-stream as a ratio of an overall data rate control value associated with each respective media sub-stream and an average rate value associated with each respective media sub-stream. In one embodiment, the overall data rate control value for a media sub-stream may be computed using data rate feedback information (e.g., data rate control sequence values) associated with respective wireless terminals scheduled to receive that media sub-stream (e.g., belonging to a media sub-group associated with the media sub-stream).

In one embodiment, in each timeslot (irrespective of whether the timeslot is an available timeslot in which a packet transmission may be scheduled to begin), a current average data rate associated with each media sub-stream supported by that base station may be computed. In one embodiment, the current average data rate associated with a media sub-stream may be updated using information received from wireless terminals scheduled to receive the media sub-stream. In one embodiment, the current average data rate for a media sub-stream may be computed using a previous average data rate computed for the media sub-stream in the previous timeslot and at least one additional parameter (e.g., current transmission rate of the media sub-stream, latency value for the media sub-stream, and the like, as well as various combinations thereof).

The present invention, by scheduling packet transmissions for media sub-streams to maximize channel utilization, attempts to ensure that, for a base station serving a plurality of wireless terminals having varying associated channel conditions, the base station selects a media sub-stream for which, based on respective channel conditions of the wireless terminals belonging to each media sub-group associated with each respective media sub-stream, the channel utilization of the channel from the base station to the wireless terminals is maximized. In other words, by scheduling packet transmissions for media sub-streams to maximize channel utilization, the present invention attempts to ensure that the base station is transmitting packets for media sub-streams in a manner proportionally fair to the media sub-streams while maximizing the channel utilization of the channel from the base station to the wireless terminals.

FIG. 1 depicts a high-level block diagram of a communication network. In general, communication network 100 of FIG. 1 comprises a communication network supporting broadcast multicast services for wireless terminals. Specifically, communication network 100 of FIG. 1 includes a content provider server (CPS) 102, a content server (CS) 104, a multicast router (MR) 106, a broadcast serving node (BSN) 108, a packet control function (PCF) 110, a base station (BS) 112, a plurality of wireless terminals (WTs) $114_1$-$114_7$ (collectively, WTs 114), a packet data serving node (PDSN) 116, a Serving Authentication, Authorization, Accounting server (S-AAA) 118, and a content controller (CC) 120. As depicted in FIG. 1, PCF 110, BS 112, and WTs 114 operate as a radio access network (RAN).

As depicted in FIG. 1, CPS 102 and CS 104 communicate using a link 131. In one embodiment, CS 104 and BSN 108 communicate using a unicast path 137 which may be a direct link or, alternatively, may include multiple unicast links connected by unicast routers (not depicted) between CS 104 and BSN 108. In one embodiment, CS 104 and BSN 108 communicate using a multicast path 133 from CS 104 to MR 106 and a multicast path 135 from MR 106 to BSN 108. Although depicted as an indirect multicast path between CS 104 and BSN 108, in one embodiment, a direct multicast path may be used between CS 104 and BSN 108. Although not depicted, in one embodiment, one or both of multicast paths 133 and 135 may include multiple multicast paths connected by other routers between CS 104 and MR 106 or MR 106 and BSN 108, respectively.

As depicted in FIG. 1, BSN 108 and PCF 110 communicate using a link 139, and PCF 110 and BS 112 communicate using a link 141. As depicted in FIG. 1, BS 112 and WTs $114_1$-$114_7$ communicate using a plurality of wireless links (WLs) $143_1$-$143_7$ (collectively, WLs 143), respectively. As depicted in FIG. 1, PCF 110 and PDSN 116 communicate using a link 145, S-AAA 118 and BSN 108 communicate using a link 147, S-AAA 118 and PDSN 116 communicate using a link 149, S-AAA 118 and CC 120 communicate using a link 151, CC 120 and PDSN 116 communicate using a link 153, and CC 120 and CPS 102 communicate using a link 155.

As depicted in FIG. 1, CPS 102 provides multimedia content (e.g., audio content, video content, and the like) to CS 104. In one embodiment, CPS 102 provides real-time multimedia content. In one embodiment, CPS 102 stores multimedia content. In one embodiment, content may be provided as programs. In one embodiment, CPS 102 is maintained by a third party provider. In one embodiment, CPS 102 streams content to CS 104. In one embodiment, CPS 102 provides content to CS 104 in response to control signals received from CC 120. In one embodiment, control signals received by CPS 102 from CC 120 may originate from WTs 114 (e.g., content requests initiated by users associated with WTs 114). In this embodiment, signaling originating from WTs 114 may traverse a signaling path originating on WTs 114, traversing BS 112, PCF 110, and PDSN 116, and terminating on CC 120.

As depicted in FIG. 1, CS 104 receives content from CPS 102. The CS 104 encodes multimedia content for transmission to BSN 108 over the core network. In one embodiment, CS 104 provides real-time video encoding of live programs and pre-processed video encoding of scheduled programs. In one embodiment, CS 104 applies application level forward error correction (FEC) to encoded video streams. As depicted in FIG. 1, CS 104 streams content from CPS 102 to BSN 108 (and, optionally, other BSNs (not depicted for purposes of clarity)). In one embodiment, CS 104 streams a highest quality media stream to BSN 108. In one embodiment, CS 104 streams the highest quality media stream to BSN 108 for each multicast group. The BSN 108 receives the streaming content from CS 104.

As depicted in FIG. 1, CS 104 may stream content to BSN 108 directly (using a unicast connection between CS 104 and BSN 108) or indirectly (using a unicast connection between CS 104 and MR 106 and a multicast connection between MR 106 and BSN 108). In one embodiment, transmission (unicast or multicast) of content from CS 104 to BSN 108 is performed using Internet Protocol (IP) and Real Time Protocol (RTP). In one embodiment, CS 104 distributes content to BSN 108 using IP multicast (where BSN 108 functions as one of the leaves of the IP multicast tree (and, optionally, other BSNs (not depicted for purposes of clarity) function as other leaves of the IP multicast tree). In one embodiment, CS 104 distributes content to BSN 108 using unicast over dedicated IP tunnels between CS 104 and BSN 108 (and, optionally, other BSNs).

As depicted in FIG. 1, BSN 108 processes a media stream received from CS 104. The media stream is associated with a respective media group which supports an associated multicast flow conveying the associated media stream from CS 104 to BSN 108. The BSN 108 processes the media stream received from CS 104 to form at least one media sub-stream conveying the same multimedia content conveyed by the media stream. The BSN 108 transmits the at least one media sub-stream toward respective at least one base station 112. The BSN 108 transmits the formed media sub-streams toward BS 112 supporting WTs 114 scheduled to receive the multimedia content conveyed by the associated media stream. The media sub-streams are associated with respective media sub-groups which support respective multicast flows adapted for conveying the associated media sub-streams.

As depicted in FIG. 1, for given multimedia content, BSN 108 may advertise media groups (media streams, multicast flows) to each of the WTs 114. As depicted in FIG. 1, each WT 114 may select one of the media groups in order to receive the multimedia content conveyed by the media stream. The WTs 114 may dynamically join respective selected media groups. The BSN 108 multicasts the media streams to WTs 114 belonging to the respective media groups using multicast flows associated with the media groups (i.e., each media stream is multicast over a different multicast tree using a different multicast flow associated with a different media group). For a given media stream, BSN 108 multicasts the media stream to each WT 114 which joined the associated media group by forming a media sub-stream for each BS 112 supporting at least one of the WTs 114 which joined the associated media group. The WTs 114 may join and leave the media groups (and, thus, the associated multicast flows) dynamically.

As depicted in FIG. 1, BSN 108 multicasts content to WTs 114. For each media stream received by BSN 108, BSN forms a media sub-stream for each BS 112 supporting at least one WT 114 scheduled to receive the content conveyed by the media stream. The BSN 108 transmits multicast traffic to PCF 110. In one embodiment, BSN 108 transmits the multicast traffic to PCF 110 using an A10 interface. The PCF 110 transmits multicast traffic to BS 112. In one embodiment, PCF 110 transmits the multicast traffic to BS 112 using an A8 interface. The BS 112 includes a base station controller and at least one base transceiver station controlled by the base station controller. The BS 112 transmits the multicast traffic to WTs 114.

As depicted in FIG. 1, BS 112 includes a scheduling module 113 adapted for scheduling transmission of packets of different media sub-streams received by BS 112 from BSN 108. In one embodiment, scheduling module 113 may be implemented as a portion of a base station controller. In one such embodiment, scheduling module 113 may be implemented using a plurality of instances (e.g., a separate scheduling module for each base transceiver station controlled by that base station controller). In one embodiment, scheduling module 113 may be implemented as a portion of a base transceiver station. The scheduling of packet transmissions for packets of different media sub-streams supported by a base station or base transceiver station may be better understood with respect to FIG. 3-FIG. 5.

In one embodiment, a content identifier uniquely identifies multimedia content conveyed by related media streams (e.g., a media stream and at least one associated media sub-stream formed from the media stream. In one embodiment, a multicast flow identifier uniquely identifies the multicast flows conveying the related media streams (i.e., the multicast flow identifier is identical for the media stream and associated media sub-streams associated with given multimedia content). In one embodiment, the content identifier is embedded within a group identifier associated with the media group or media sub-group. In this embodiment, WTs 114 may identify specific content using the content identifier, and may select one of the media sub-groups (i.e., the multicast flow conveying an associated one of the media sub-streams) using the multicast flow identifier. In one embodiment, identification of media streams (and sub-streams), media groups (and sub-groups), and multicast flows may be substantially equivalent determinations.

As depicted in FIG. 1, a data channel 160 conveys multimedia content from CPS 102 to WT $114_7$. As depicted in FIG. 1, data channel 160 traverses a path including CPS 102, CS 104, MR 106 (optionally), BSN 108, PCF 110, BS 112, and WT $114_7$. The data channel 160 conveys the multimedia content from CS 104 to BSN 108 as a media stream using an associated media group. The data channel 160 conveys the multimedia content from BSN 108 to BS 112 as a media sub-stream using an associated media sub-group. The data channel 160 conveys the multimedia content from BS 112 to WT $114_7$ as the media sub-stream using the associated media sub-group. The formation of media sub-streams, and scheduling of respective sub-stream transmissions from BTSs 112 to WTs 114 may be better understood with respect to FIG. 2-FIG. 6 depicted and described herein As depicted in FIG. 1, a control channel 170, including control channel portions $170_A$ and $170_B$, conveys control information between WTs 114 and communication network 100. As depicted in FIG. 1, control channel 170 traverses a path including WT $114_1$, BS 112, PCF 110, PDSN 116, and CC 120, control channel portion $170_A$ traverses a path including CC 120 and CPS 102, and control channel portion $170_B$ traverses a path including CC 120, S-AAA 118, and BSN 108. As depicted in FIG. 1, WTs 114 may be adapted for receiving, processing, and transmitting various combinations of data signals and control signals associated with such data channels and control channels.

As depicted in FIG. 1, WTs 114 include wireless terminals operable for receiving and transmitting wireless signals adapted for conveying various information, including voice content, multimedia content, control signals and the like, as well as various combinations thereof. In one embodiment, WTs 114 comprise mobile handsets. In one embodiment, in which communication network 100 is implemented as a CDMA2000 1xRTT network, WTs 114 may be denoted as mobile stations (MSs). In one embodiment, in which communication network 100 is implemented as a CDMA2000 EvDO network or CDMA2000 HRPD network, WTs 114 may be denoted as access terminals (ATs). Although primarily described herein as mobile handsets, in one embodiment, various other wireless devices may operate in accordance with embodiments of the present invention.

The WTs 114 operate as presentation devices. The WTs 114 include user interfaces. The WTs 114 are operable for processing received information (e.g., voice communication, audio clips, video clips, and the like) for presentation via the user interface (e.g., speaker, screen, and the like). The WTs 114 are operable for processing information (e.g., voice communications, pictures, and the like) captured via the user interface (e.g., microphone, camera, and the like) for transmission towards the network. Although not depicted, WTs 114 may include various other control modules, communication modules, processor modules, input-output modules, and the like, as well as various combinations thereof. In one embodiment, control channels may be implemented between WTs 114 and network components (illustratively, CC 120, BSN 108, and the like) for performing various control functions.

The WTs 114 may utilize control channels to convey control signals adapted for controlling multimedia content received by WTs 114. In one embodiment, the control signals may include commands entered by users via user interfaces of WTs 114. In one embodiment, control signals adapted for controlling multimedia content may be transmitted from WTs 114 to CC 120. In one embodiment, control signals adapted for controlling multimedia content received by WTs 114 may traverse a signaling path from WTs 114 to CC 120 that traverses BS 112, PCF 110, and PDSN 116 (illustratively, control channel 170). In one embodiment, control channels between WTs 114 and CC 120 may be implemented as bidirectional unicast IP connections. In one such embodiment, WTs 114 may retrieve information (e.g., content, session, and the like) from CC 120 using Transmission Control Protocol (TCP) and Hypertext Transfer Protocol (HTTP).

As depicted in FIG. 1, CC 120 processes control signals received from WTs 114. The CC 120 signals CPS 102 according to commands conveyed by the control signals received from WTs 114 (illustratively, using control channel portion $170_A$). In one embodiment, in which control signals received from WTs 114 include requests for multimedia content, CC 120 may request that CPS 102 begin streaming requested multimedia content (e.g., a requested audio clip, video clip, and the like) towards WTs 114. In one embodiment, in which control signals received from WTs 114 include requests for executing trick-play functions (e.g., rewind, fast-forward, pause, and the like) on streaming multimedia content, CC 120 may request that CPS 102 provide trick-play functions for multimedia content streaming from CPS 102 to WTs 114.

Although specific control functions are described, CC 120 may support various other functions for controlling CPS 102.

In one embodiment, WTs 114 use respective reverse control channels between WTs 114 and BS 112 to send control signals adapted for controlling transmission of media sub-streams on a forward data channel from BS 112 to WTs 114 (i.e., for selecting between media sub-streams supported by BS 112 in order to schedule transmissions of packets from the media sub-streams on the forward data channel from BS 112 to WTs 114). In one embodiment, control signals provided by WTs 114 to BS 112 for controlling scheduling of packet transmissions for media sub-streams may convey data rate feedback information from WTs 114 to BS 112. The data rate feedback information provided from WTs 114 to BS 112 using respective reverse control channels may include various information, parameters, and the like, as well as various combinations thereof.

In one embodiment, data rate feedback information includes data rate control (DRC) information. In one embodiment, data rate control information includes respective data rate control sequences determined by respective WTs 114. In one embodiment, data rate control information includes data rates requested by respective WTs 114. In one such embodiment, the data rate requested by a WT 114 is a maximum data rate which may be supported by that WT 114 based on the current channel condition of forward data channel from the BS 112 to that WT 114 (e.g., respective highest data rates at which WTs 114 may reliably receive packets). Although primarily described herein with respect to data rate control sequences, in one embodiment, WTs 114 may use respective reverse control channels for providing other various other data rate feedback information adapted for use in scheduling packet transmissions for a plurality of media sub-streams.

As depicted in FIG. 1, communication network 100 is implemented as a Third Generation Partnership Project Two (3GPP2) Code Division Multiple Access 2000 (CDMA-2000) network. In one embodiment, communication network 100 may be implemented as one of a CDMA2000 One Times Radio Transmission Technology (1xRTT) network, a CDMA2000 Evolution Data Optimized (EvDO) network, a CDMA2000 High Rate Data Packet (HRDP) network, and the like. Although primarily depicted and described herein with respect to a CDMA2000 network, in one embodiment, communication network 100 may be implemented as a Third Generation Partnership Project (3GPP) Universal Mobile Telecommunications System (UMTS) network. Although primarily depicted and described with respect to 3GPP and 3GPP2 networks, in one embodiment, communication network 100 may be implemented using various other networking technologies.

As depicted in FIG. 1, communication network 100 of FIG. 1 is adapted for conveying multimedia content from a content provider (illustratively, CPS 102) to wireless terminals (illustratively, WTs 114). In general, 3GPP2 networks support Broadcast Multicast Service (BCMCS) and 3GPP networks support Multimedia Broadcast Multicast Services (MBMS). In general, multicast is an efficient means of transmitting the identical content to multiple receivers while minimizing network resource usage, supporting a wide range of multimedia services for wireless networks. In general, multimedia services such as live television, news summaries, sports highlights, local traffic and weather reports, and the like, as well as various combinations thereof, may be efficiently delivered (scheduled or on-demand) to wireless terminals using broadcast multicast.

Although 3GPP, 3GPP2, and like networking standards depicted and described with respect to FIG. 1 define specific configurations of network components suggested for providing specific functionality, such standards typically specify logical configurations of network components (leaving physical implementations unspecified). As depicted in FIG. 1, communication network 100 comprises a specific configuration in which each logical component is implemented as a standalone physical component. In one embodiment, depicted and described herein with respect to FIG. 2, various combinations of logical network components depicted and described herein with respect to FIG. 1 may be implemented using other combinations of physical network components.

Figure 2:
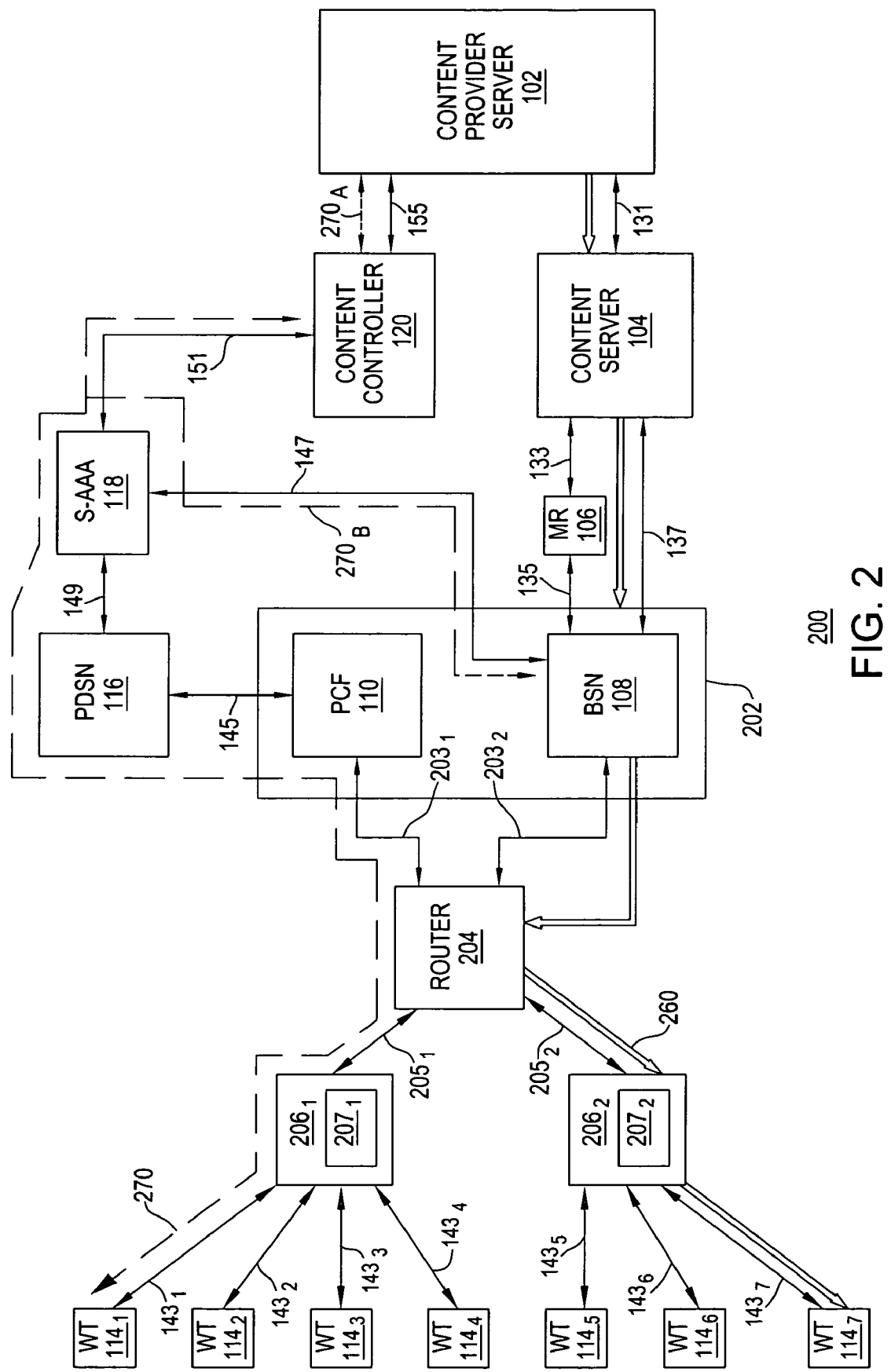
FIG. 2 depicts a high-level block diagram of a physical implementation of the communication network of FIG. 1.

FIG. 2 depicts a high-level block diagram of a physical implementation of the communication network of FIG. 1. Specifically, with some exceptions, physical communication network 200 of FIG. 2 is substantially similar to logical communication network 100 of FIG. 1. As depicted in FIG. 2, BSN 108 and PCF 110 may be implemented as portions of a base station controller (e.g., radio network controller (RNC)). As depicted in FIG. 2, BSN 108 and PCF 110 communicate with WTs 114 using a router 204 and a plurality of base transceiver stations (BTSs) 206$_1$-206$_2$ (collectively, BTSs 206). As depicted in FIG. 2, BSN 108 and PCF 110 communicate with router 204 using links 203$_1$ and 203$_2$ (collectively, links 203), respectively, and router 204 communicates with BTSs 206$_1$ and 206$_2$ using links 205$_1$ and 205$_2$ (collectively, links 205), respectively. As depicted in FIG. 2, BTSs 206$_1$ and 206$_2$ communicate with WTs 114$_1$-114$_4$ and 114$_5$-114$_7$, respectively.

As depicted in FIG. 2, a data channel 260 (similar to data channel 160 depicted and described herein with respect to FIG. 1) conveys multimedia content from CPS 102 to WT114$_7$. As depicted in FIG. 2, data channel 260 traverses a path including CPS 102, CS 104, MR 106 (optionally), BSN 108, router 204, BTS 206$_2$, and WT 114$_7$. As depicted in FIG. 2, a control channel 270 including control channel portions 270$_A$ and 270$_B$ (similar to control channel 170 and control channel portions 170$_A$ and 170$_B$ depicted and described herein with respect to FIG. 1), conveys control information between WT 114$_1$ and communication network 200. As depicted in FIG. 1, control channel 270 traverses a path including WT 114$_1$, BTS 206$_1$, router 204, PCF 110, PDSN 116, S-AAA 118, and CC 120. As depicted in FIG. 2 links 143 may support forward data channels and reverse control channels between BTSs 206 and associated WTs 114.

As depicted in FIG. 2, transmission of packets from each BTS 206 p toward associated WTs 114 uses a respective forward data channel. In one embodiment, transmission of packets from each BTS 206 toward associated WTs 114 is performed using time division multiplexing. For example, in a CDMA2000 1xEvDO/HDR system, a forward data channel supported by a BTS is divided into timeslots of duration 1.67 ms (i.e., one second is divided into 600 timeslots). The WTs associated with the BTS share the forward data channel. In this example, the forward data channel supports the following data rates: 38.4 kbps, 76.8 kbps, 102.4 kbps, 153.6 kbps, 204.8 kbps, 307.2 kbps 614.4 kbps 921.6 kbps, 1.2 Mbps 1.8 Mbps and 2.4 Mbps, where each data rate has a fixed packet size (including turbo codes used for error correction): 1024 bits, 2048 bits, 3072 bits, 4096 bits. In this example, depending on the data rate, a packet may occupy between one and sixteen timeslots.

As described herein with respect to FIG. 1, WTs 114 may transmit data rate feedback information to BS 112 (i.e., to the base station from which the wireless terminal receives the media sub-stream). As depicted in FIG. 2, in one embodiment, WTs 114 may transmit data rate feedback information to respective BTSs 206. In one embodiment, data rate feedback information is sent by WTs 114 once for each timeslot of the respective forward data channels from BTSs 206 to WTs 114 supported by respective BTSs 206. In one embodiment, the data rate feedback information sent from a WT 114 to an associated BTS 206 in each timeslot includes a data rate control (DRC) sequence. In one embodiment, the DRC sequence includes a four-bit DRC sequence.

In one embodiment, data rate feedback information from a WT 114 includes a highest data rate at which the WT 114 may reliably receive the media sub-stream from associated BTS 206. In one embodiment, the highest data rate at which the WT 114 may reliably receive the media sub-stream from associated BTS 206 may be determined by the WT 114 using a signal-to-interference-and-noise ratio (SINR) measure by the WT 114. In one embodiment, WT 114 computes a highest data rate that may be supported given the predicted SINR in order to achieve a given physical level error rate (e.g., packet error rate, frame error rate, and the like) adapted to achieve a certain physical layer transmission reliability.

As depicted in FIG. 2, BTSs $206_1$ and $206_2$ include a respective plurality of sub-stream selection modules (SSM) $207_1$ and $207_2$ (collectively, SSMs 207), respectively. As depicted in FIG. 2, SSMs 207 are adapted for scheduling transmission of packets over a data channel between BTSs 206 and WTs 114. The SSMs 207 are adapted for selecting one of a plurality of media sub-streams supported by the respective BTSs 206. The SSMs 207 are adapted for processing data rate feedback information for selecting one of the media sub-streams for which the next packet is transmitted. The functions of SSMs 207 may be better understood with respect to FIGS. 3-6 depicted and described herein.

Although primarily depicted and described herein with respect to specific network configurations of network components, network functions, communication links, data flows, control flows, and the like, the present invention may be implemented using various other network configurations of network components, network functions, communication links, data flows, control flows, and the like, as well as various combinations thereof. Although, for purposes of clarity, depicted and described with respect to one base station (illustratively, BS 112), in one embodiment, BSN 108 may multicast a plurality of multicast flows (associated with respective media streams) over a plurality of base stations serving respective pluralities of wireless terminals.

Figure 3:
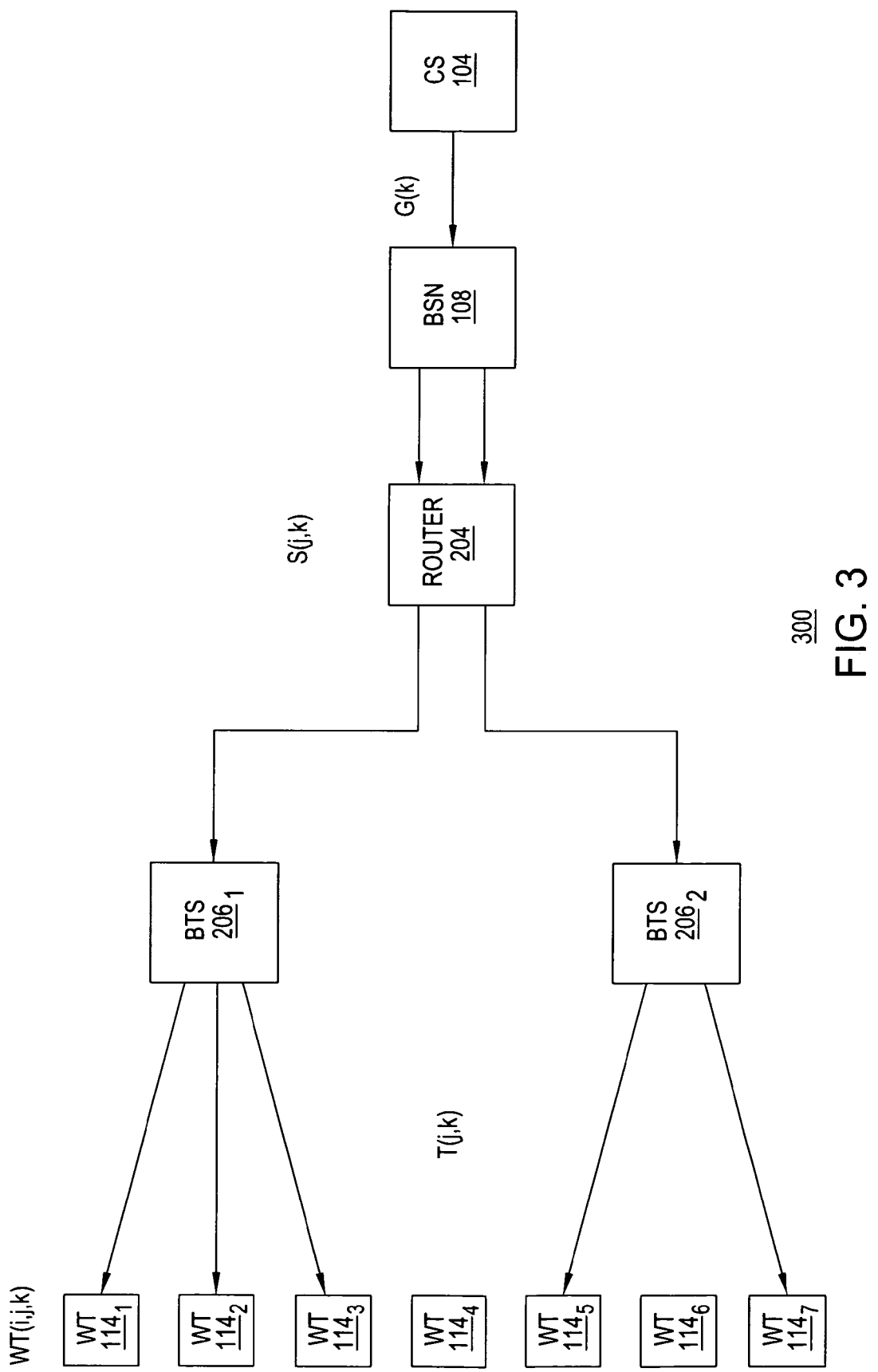
FIG. 3 depicts a high-level block diagram of a portion of the communication network of FIG. 2 from the perspective of a broadcast serving node, in which a media group is processed to form a pair of media sub-groups.

FIG. 3 depicts a high-level block diagram of a portion of the communication network of FIG. 2 from the perspective of a broadcast serving node, in which a media group is processed to form a pair of media sub-groups. As depicted in FIG. 3, CS 104 streams a media stream to BSN 108 using an associated media group. The BSN 108 processes the received media stream to form: a first media sub-stream transmitted to BTS $206_1$ via router 204 using a first media sub-group and a second media sub-stream transmitted to BTS $206_2$ via router 204 using a second media sub-group. The BTSs $206_1$ and $206_2$ transmit respective first and second media sub-streams to associated WTs 114 scheduled to receive content conveyed by the media stream.

As depicted in FIG. 3, BTS $206_1$ transmits the first media sub-stream to WTs $114_1$, $114_2$, and $114_3$ and BTS $206_2$ transmits the second media sub-stream to WTs $114_5$ and $114_7$. The WTs $114_1$, $114_2$, and $114_3$ form a first media sub-group rooted at BTS $206_1$. The WTs $114_1$, $114_2$, $114_3$, $114_5$, and $114_7$ form a media group adapted for receiving the content conveyed by the media stream using a multicast tree rooted at BSN 108. The WTs $114_1$, $114_2$, $114_3$, $114_5$, and $114_7$ form a media group adapted for receiving the content conveyed by the media stream using a multicast tree rooted at BSN 108. In other words, as depicted in FIG. 3, at each BTS 206, the BTS 206 sends a media sub-stream to WTs 114 which are members of the media group associated with the media stream.

Although depicted with respect to one media stream (media group) and two associated media sub-streams (media sub-groups), BSN 108 may receive and process additional media streams, and, depending on the number of BTSs supporting WTs requesting the multimedia content conveyed by each media stream, BSN 108 may process each of the media streams to form fewer or more associated media sub-streams. For purposes of clarity, media groups, media sub-groups, base transceiver stations, and wireless terminals requesting multimedia content conveyed by media groups may be identified using an indexing scheme (as depicted in FIG. 1).

In one indexing scheme, depicted in FIG. 3, a media group rooted at a BSN (as well as the media stream sent over that media group) may be denoted by G(k), where k=1, ..., G, where G is the total number of media groups rooted at the BSN. In this indexing scheme, assuming a total of B BTSs connected to the BSN, each BTS may be denoted by BTS(j), where j=1, ..., B. The media sub-group rooted at BTS(j) (as well as the media sub-stream sent over that media sub-group) for media group G(k) may be denoted as S(j,k), where j=1, ..., B and k=1, ..., G. Since different numbers of WTs supported by each BTS may belong to the media group, the media sub-group size for media sub-group S(j,k) may be denoted as T(j,k). Using this indexing scheme, each WT that is a member of media group G(k) and connected to BTS(j) may be denoted as WT(i,j,k), where i=1, ..., T(j,k), j=1 ..., B, and k=1, ..., G.

Using this indexing scheme, the media group (and associated media stream) received and processed by BSN 108 may be denoted as G(1). The first BTS $206_1$ may be denoted as BTS(1) and the second BTS $206_2$ may be denoted as BTS(2). The first media sub-group (and associated media sub-stream) formed by BSN 108 from media group G(1) and rooted at BTS(1) may be denoted as S(1,1) and the second media sub-group (and associated media sub-stream) formed by BSN 108 from media group G(1) and rooted at BTS(2) may be denoted as S(2,1). As depicted in FIG. 3, the size of media sub-group S(1,1) may be denoted as T(1,1)=3 and the size of media sub-group S(2,1) may be denoted as T(2,1)=2. Using this indexing scheme, WTs $114_1$, $114_2$, $114_3$, $114_5$, and $114_7$ may be denoted as WT(1,1,1), WT(2,1,1), WT(3,1,1), WT(1,2,1), and WT(2,2,1), respectively.

For purposes of clarity in describing an indexing scheme in accordance with the present invention, the indexing scheme of FIG. 3 is depicted and described from the perspective of a broadcast serving node (illustratively, BSN 108) processing one media group to form an associated pair of media sub-groups. Although depicted and described with respect to one media group, since the scheduling algorithm of the present invention is adapted for controlling scheduling of packet transmissions associated with a plurality of media sub-streams received by a base transceiver station, the present invention may be further depicted and described from the perspective of a base transceiver station. The functions performed by a BTS for controlling scheduling of packet transmissions associated with a plurality of media sub-streams received by the base transceiver station may be better understood with respect to FIG. 4.

Figure 4:
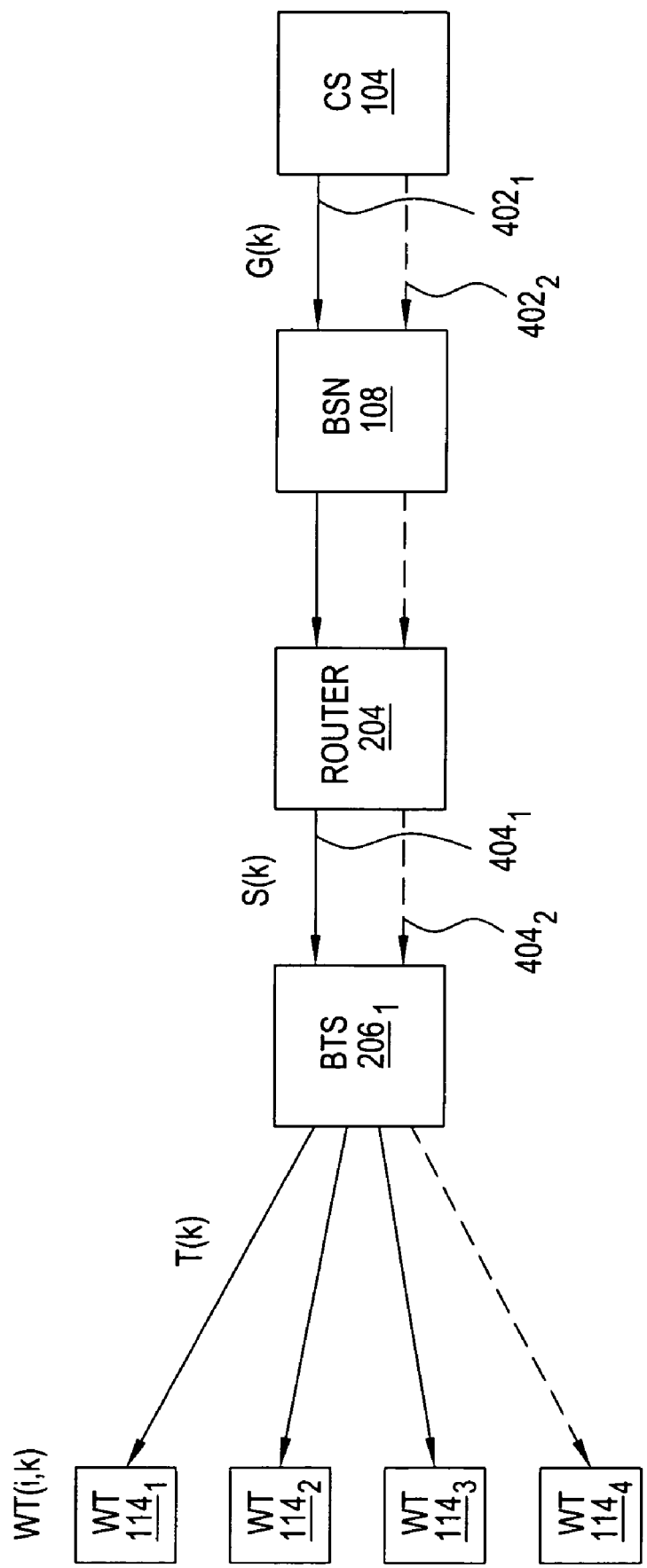
FIG. 4 depicts a high-level block diagram of a portion of the communication network of FIG. 2 from the perspective of a base transceiver station, in which the base transceiver station supports a pair of media sub-groups associated with a respective pair of media groups.

FIG. 4 depicts a high-level block diagram of a portion of the communication network of FIG. 2 from the perspective of a base transceiver station, in which the base transceiver station supports a pair of media sub-groups associated with a respective pair of media groups. Since FIG. 4 is depicted and described from the perspective of a BTS, the BTS(j) index depicted and described herein with respect to FIG. 3 is omitted from FIG. 4. As such, the indexing scheme depicted and described with respect to FIG. 3 may be modified such that media sub-group S(j,k) may be modified to media sub-group S(k), media sub-group size T(j,k) may be modified to media sub-group size T(k), and wireless terminal WT(i,j,k) may be modified to wireless terminal WT(i,k).

As depicted in FIG. 4, CS 104 streams a first media stream $402_1$ conveying first content and a second media stream $402_2$ conveying second content to BSN 108. The BSN 108 processes the first media stream $402_1$ to form a first media sub-stream $404_1$ transmitted to BTS $206_1$ via router 204 using a first media sub-group. The BSN 108 processes the second media stream $402_2$ to form a second media sub-stream $404_2$ transmitted to BTS $206_1$ via router 204 using a second media sub-group. The BTS $206_1$ transmit first and second media sub-streams $404_1$ and $404_2$ to associated WTs 114 scheduled to receive content conveyed by the media stream. As depicted in FIG. 4, BTS $206_1$ transmits first media sub-stream $404_1$ to WTs $114_1$, $114_2$, and $114_3$ and transmits second media sub-stream $404_2$ to WT $114_4$. The BTS $206_1$ schedules packet transmission associated with first and second media sub-streams $404_1$ and $404_2$ using a scheduling algorithm.

As depicted in FIG. 4, WTs $114_1$, $114_2$, and $114_3$ form a first media sub-group rooted at BTS $206_1$ and WT $114_4$ forms a second media sub-group rooted at BTS $206_1$. Using the modified indexing scheme of FIG. 4, the first media group (and associated first media stream) received and processed by BSN 108 and the second media group (and associated second media stream) received and processed by BSN 108 may be denoted as G(1) and G(2), respectively. The first media sub-group (and associated first media sub-stream) formed by BSN 108 from first media group G(1) and rooted at BTS $206_1$ may be denoted as S(1) and the second media sub-group (and associated second media sub-stream) formed by BSN 108 from second media group G(2) and rooted at BTS(2) may be denoted as S(2). Using the modified indexing scheme, WTs $114_1$, $114_2$, $114_3$, and $114_4$ may be denoted as WT(1,1,), WT(2,1,), WT(3,1,), and WT(1,2,), respectively.

As described herein, in one embodiment, since each base transceiver station may receive a plurality of media sub-streams from an associated broadcast serving node, each base transceiver station utilizes a packet transmissions scheduling algorithm for scheduling packet transmissions associated with the media sub-streams received by the base transceiver station. In one embodiment, the packet transmission scheduling algorithm includes: (1) a scheduling step and (2) an average data rate update step. In one embodiment, the scheduling step is performed in each timeslot in which a new packet transmission begins (i.e. the previously transmitted packet ended in the previous timeslot). In one embodiment, the average data rate update step is performed for each timeslot.

In one embodiment, during each scheduling step, the BTS selects one of the plurality media sub-streams received by the BTS. The BTS transmits the next packet scheduled for transmission for the selected media sub-stream. In one embodiment, the BTS selects one of the plurality of media sub-streams using data rate feedback information received for each media sub-stream, wherein the data rate feedback information is received from WTs belonging to respective media sub-groups associated with respective media sub-streams. In one embodiment, the BTS selects one of the plurality of media sub-streams using average data rate information computed by the BTS during the average data rate update step.

In one embodiment, the BTS selects the one of the media sub-streams having a highest rate ratio. In this embodiment, the BTS computes the rate ratio for each media sub-stream. In one embodiment, the BTS computes the rate ratio for each media sub-stream S(k) as DRC(k,t)/R(k,t), where DRC(k,t) is an overall data rate control value for media sub-stream S(k) in timeslot t and R(k,t) is the average data rate for media sub-stream S(k) in timeslot t. In one embodiment, data rate control value DRC(k,t) is determined using data rate feedback information received by the BTS for media sub-streams S(k) in timeslot t. In one embodiment, current average data rate R(k, t) is determined using a previous average data rate R(k,t−1) for sub-stream S(k), a current transmission rate C(k) for sub-stream S(k), and an associated latency value (denoted as $t_c$).

In one embodiment, in which data rate feedback information for each WT includes a data rate control sequence, the overall data rate control value DRC(k,t) associated with media sub-stream S(k) may be determined using respective individual data rate control sequences (denoted as DRC(i,k,t)) received from each $WT_i$ scheduled to receive the content conveyed by the media stream from which media sub-stream S(k) is formed (i.e., DRC(k,t)=f[DRC(i,k,t) for i=1, . . . , T(k)]). The data rate control function f[DRC(i,k,t) for i=1, . . . , T(k)] used for determining an overall data rate control value DRC(k,t) may include one of a plurality of data rate control functions. Although specific data rate control functions are described herein, various other data rate control functions may be used for scheduling transmissions of packets from media sub-streams.

In one embodiment, data rate control function f[DRC(i,k,t) for i=1, . . . , T(k)] may be implemented as a mean function such that the overall data rate control value DRC(k,t) for sub-stream S(k) is computed as a mean of the individual data rate control values (DRC(i,k,t)) received by the associated BTS from the WTs scheduled to receive media sub-stream S(k) (i.e., DRC(k,t)=mean(DRC(i,k,t) for i=1, . . . , T(k))). In one embodiment, data rate control function f[DRC(i,k,t) for i=1, . . . , T(k)] may be implemented as a minimum function such that the overall data rate control value DRC(k,t) for sub-stream S(k) is computed as a minimum of the individual data rate control values (DRC(i,k,t)) received by the associated BTS from the WTs scheduled to receive media sub-stream S(k) (i.e., DRC(k,t)=min(DRC(i,k,t) for i=1, . . . , T(k))).

In one embodiment, the average data rate update step is performed for each media sub-stream during each timeslot. In one embodiment, a current average data rate R(k,t) for media sub-stream S(k) is determined using a previous average data rate R(k,t−1) for media sub-stream S(k). In one embodiment, a current average data rate R(k,t) for media sub-stream S(k) is determined using a current transmission rate C(k) for media sub-stream S(k). In one embodiment, current transmission rate C(k) for media sub-stream S(k) is equal to DRC(k, t) if media sub-stream S(k) is currently selected by the BTS for transmitting a packet or, otherwise, is equal to zero if media sub-stream S(k) is not currently selected by the BTS for transmitting a packet. In one embodiment, current average data rate R(k,t) for media sub-stream S(k) is determined using a latency value $t_c$. In one embodiment, latency value $t_c$ may be a constant (e.g., a constant number of timeslots, such as one timeslot, two timeslots, four timeslots, and the like).

In one embodiment, current average data rate R(k,t) may be computed as $R(k,t)=[(1-1/t_c)R(k,t-1)+(1/t_c)C(k)]$. In this embodiment, current average data rate R(k,t) for media sub-stream S(k) is computed using a previous average data rate R(k,t−1) for sub-stream S(k) from previous timeslot t−1. In one embodiment, depending on the timing of the scheduling step and the average data rate update step, a subsequent average data rate R(k,t+1) for media sub-stream S(k) may be computed for use during a subsequent timeslot t+1 using a current average data rate R(k,t) for sub-stream S(k) (i.e., R(k,t+1)=[(1−1/$t_c$)R(k,t)+(1/$t_c$)C(k)]). Although primarily described herein with respect to a specific computation for current average data rate R(k,t), in one embodiment, current average data rate R(k,t) may be computed using various information, parameters, constants, and the like, as well as various combinations thereof.

For example, with respect to FIG. 4, at timeslot t, BTS $206_1$ determines data rate control function DRC(1,t) for first media sub-stream $404_1$ using respective data rate control values DRC(1,1,t), DRC(2,1,t), and DRC(3,1,t) received from WTs $114_1$, $114_2$, and $114_3$, respectively, scheduled to receive the multimedia content conveyed by first media stream $402_1$ from which first media sub-stream $404_1$ is formed. In this example, BTS $206_1$ determines average data rate R(1,t) for first media sub-stream $404_1$. In this example, BTS $206_1$ computes the rate ratio for the first media sub-stream $404_1$ as DRC(1,t)/R(1,t) for use in selecting the media sub-stream from which the next packet is transmitted toward WTs 114.

In continuation of this example, at timeslot t, BTS $206_1$ determines data rate control function DRC(2,t) for second media sub-stream $404_2$ using data rate control value DRC(1,2,t) received from WT $114_4$ scheduled to receive the multimedia content conveyed by second media stream $402_2$ from which second media sub-stream $404_2$ is formed. In this example, BTS $206_1$ may determine average data rate R(2,t) for second media sub-stream $404_2$. In this example, BTS $206_1$ computes the rate ratio for the second media sub-stream $404_2$ as DRC(2,t)/R(2,t) for use in selecting the media sub-stream from which the next packet is transmitted toward WTs 114. The BTS $206_1$ uses the respective rate ratios to select either first media sub-stream $404_1$ or second media sub-stream $404_2$ for which the next packet is transmitted by BTS $206_1$.

Figure 5:
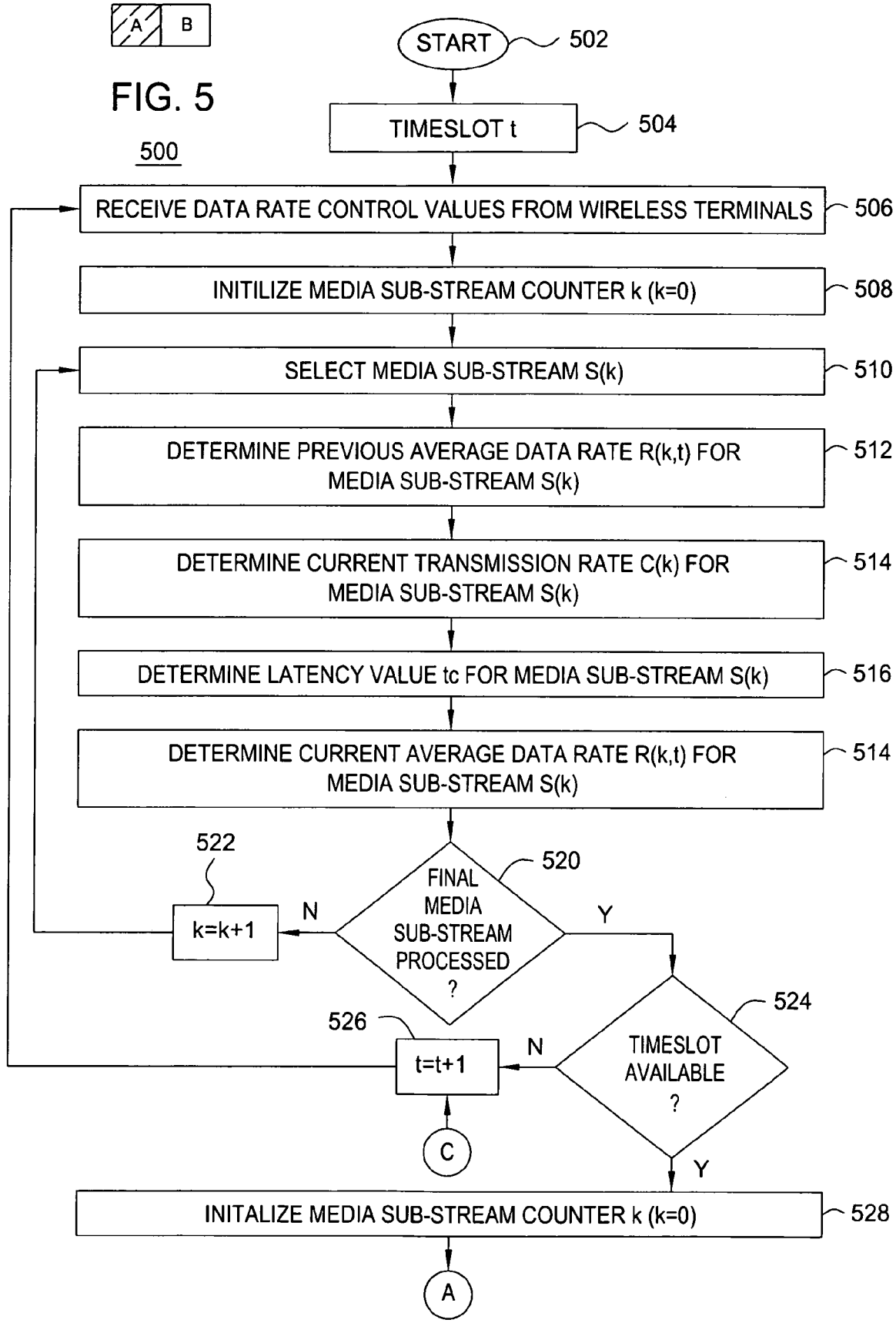
FIG. 5 depicts a method according to one embodiment of the present invention.
Figure 5:
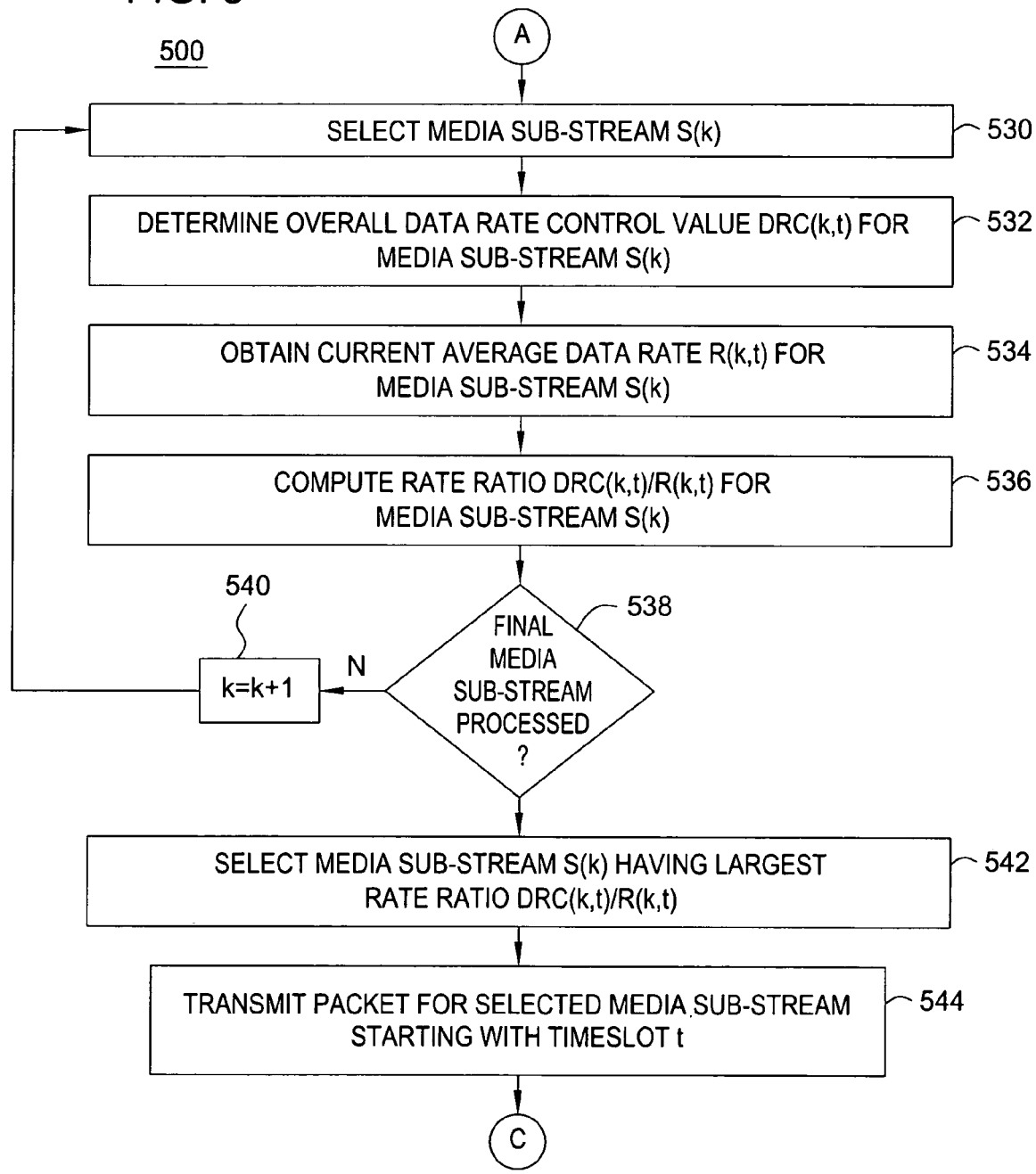

FIG. 5 depicts a method according to one embodiment of the present invention. Specifically, method 500 of FIG. 5 depicts a method for selecting a media sub-stream from which an associated data packet is transmitted in an available timeslot. Although depicted and described with respect to one BTS, it should be noted that since media sub-streams formed from a media stream may be split across multiple BTSs, method 500 depicted and described with respect to FIG. 5 may be performed on each of the BTSs. Although depicted as being performed serially, those skilled in the art will appreciate that at least a portion of the steps of method 500 may be performed contemporaneously, or in a different order than presented in FIG. 5. The method 500 begins at step 502 and proceeds to step 504.

At step 504, method 500 is at a current timeslot t. At step 506, data rate control values are received from wireless terminals associated with the BTS. At step 508, media sub-stream counter k is initialized to zero (e.g., k=0). At step 510, media sub-stream S(k) is selected. At step 512, previous average data rate R(k,t) is determined for media sub-stream S(k). At step 514, current transmission rate C(k) is determined for media sub-stream S(k). In one embodiment, current transmission rate C(k) for media sub-stream S(k) is equal to DRC(k,t) if media sub-stream S(k) is currently selected by the BTS for transmitting a packet or, otherwise, is equal to zero if media sub-stream S(k) is not currently selected by the BTS for transmitting a packet. At step 516, latency value $t_c$ is determined for media sub-stream S(k). In one embodiment, latency value $t_c$ may be a constant number of timeslots.

At step 518, current average data rate R(k,t) is determined for media sub-stream S(k). At step 520, a determination is made as to whether the final media sub-stream is processed. If the final media sub-stream is not processed, method 500 proceeds to step 522. At step 522, media sub-stream counter k is incremented (i.e., k=k+1). From step 522, method 500 returns to step 510, at which point the next media sub-stream is selected. Although described with respect to the use of a media sub-stream counter value for controlling processing of media sub-streams, processing of media sub-streams may be tracked using various other methods. If the final media sub-stream is processed, method 500 proceeds to step 524.

At step 524, a determination is made as to whether timeslot t is available. In one embodiment, the determination as to whether timeslot t is available is a determination as to whether a packet transmission may begin with timeslot t. If timeslot t is not available (i.e. a packet transmission which began in a previous timeslot is not complete), method 500 proceeds to step 526. At step 526, the current timeslot changes (i.e., t=t+1). From step 526, method 500 returns to step 506, at which point the next group of data rate control values is received from the wireless terminals. If the final media sub-stream is processed, method 500 proceeds to step 528.

At step 528, media sub-stream counter k is reinitialized to zero (e.g., k=0). At step 530, media sub-stream S(k) is selected. At step 532, overall data rate control value DRC(k,t) is determined for media sub-stream S(k). The overall data rate control value DRC(k,t) may be determined using a data rate control function adapted for processing individual data rate control values DRC(i,k,t) received from respective WTs associated scheduled to receive content conveyed by media sub-stream S(k). At step 534, current average data rate R(k,t) (determined in step 518) is obtained for media sub-stream S(k). At step 536, rate ratio DRC(k,t)/R(k,t) is computed for media sub-stream S(k).

At step 538, a determination is made as to whether the final media sub-stream is processed. If the final media sub-stream is not processed, method 500 proceeds to step 540. At step 540, media sub-stream counter k is incremented (i.e., k=k+1). From step 540, method 500 returns to step 530, at which point the next media sub-stream is selected for processing. Although described with respect to the use of a media sub-stream counter value for controlling processing of media sub-streams, processing of media sub-streams may be tracked using various other methods. If the final media sub-stream is processed, method 500 proceeds to step 542.

At step 542, media sub-stream S(k) having the largest rate ratio DRC(k,t)/R(k,t) is selected. Although described with respect to use of rate ratio DRC(k,t)/R(k,t) for selecting one of the media sub-streams S(k) for which a packet is transmitted toward associated WTs scheduled to receive the media sub-stream S(k), various other measures may be used for determining which media sub-stream to select. At step 544, a packet is transmitted for the selected media sub-stream. The transmission of a packet associated with the selected media sub-stream, which may require any number of timeslots (e.g., 1 timeslot, 4 timeslots, 16 timeslots, and the like), begins in timeslot t. From step 544, method 500 returns to step 526, at which point the current timeslot changes (i.e., t=t+1).

Figure 6:
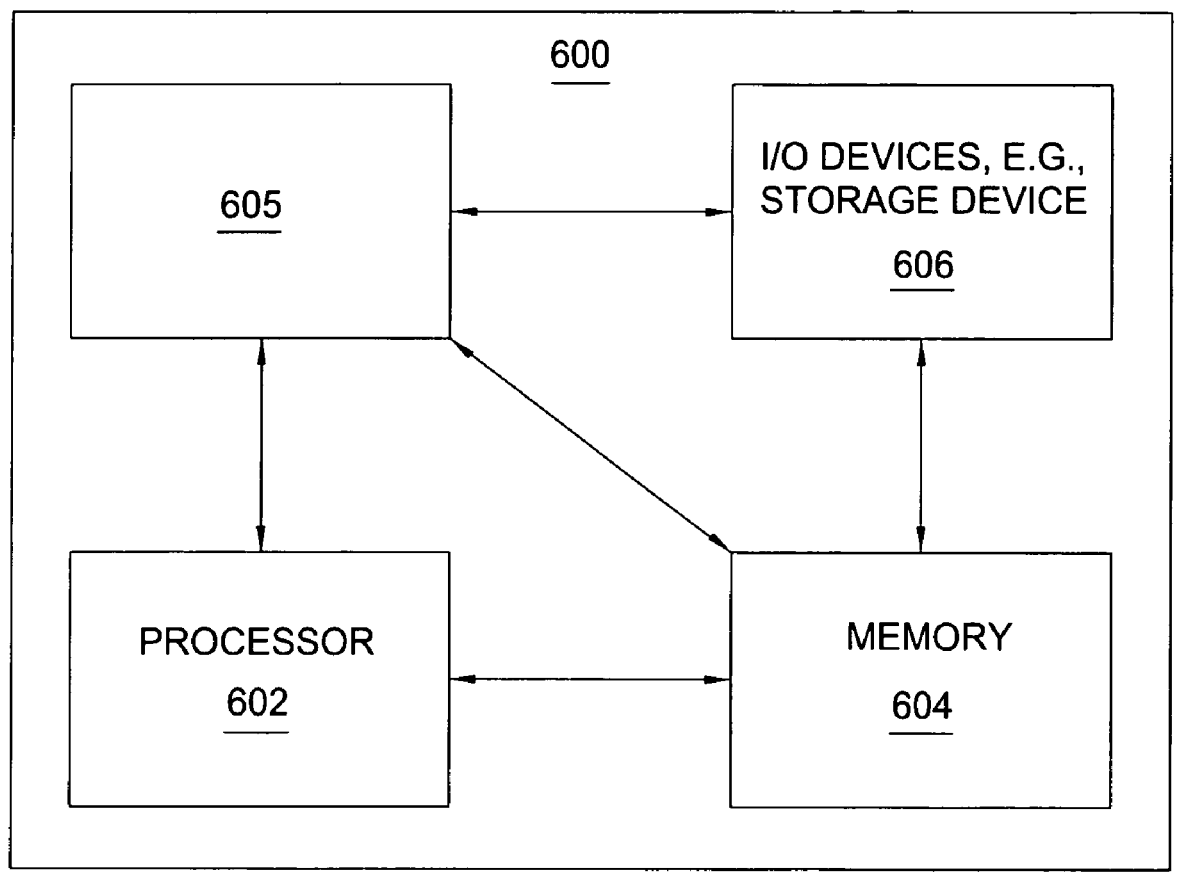
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), a media sub-stream selection module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present media sub-stream selection module or process 605 can be loaded into memory 604 and executed by processor 602 to implement the functions as discussed above. As such, media sub-stream selection process 605 (including associated data structures) of the present invention can be stored on a computer readable medium or carrier, e.g., RAM memory, magnetic or optical drive or diskette and the like.

Although primarily depicted and described herein with respect to a 3GPP2 CDMA2000 1xRTT network in which a BSN performs media stream transcoding, advertising, multi-casting, and the like, in one embodiment, media stream transcoding, advertising, multicasting, and the like, as well as other functions, as well as various combinations thereof may be performed by other network elements within 3GPP2 CDMA2000 networks, within other 3GPP2 CDMA2000 networks (e.g., EvDO, HRPD, and the like), within other 3G networks (e.g., 3GPP UMTS networks), within other wireless-based networks, and the like, as well as various combinations thereof. For example, in one embodiment, at least a portion of the functions of the present invention depicted and described herein with respect to BSNs may be performed by Gateway GPRS Support Nodes (GGSNs) in 3GPP UMTS networks.

Although various embodiments which incorporate the teachings of the present invention have been shown and described in detail herein, those skilled in the art can readily devise many other varied embodiments that still incorporate these teachings.

What is claimed is:

1. A method for scheduling packet transmissions on a data channel of a base transceiver station serving a plurality of wireless terminals, wherein the base transceiver station supports a plurality of media sub-streams available for transmission toward the wireless terminals, wherein each of the media sub-streams is associated with a respective media sub-group having a plurality of wireless terminals associated therewith, the method comprising:

updating a plurality of average data rates for the respective media sub-streams;

computing, for an available timeslot, a plurality of utilization evaluation values for the respective media sub-streams, wherein, for each media sub-stream, the utilization evaluation value for the media sub-stream is computed using data rate feedback information from wireless terminals associated with the media sub-group of the media sub-stream and the average data rate of the media sub-stream;

selecting one of the media sub-streams having an associated utilization evaluation value indicative of a best available channel utilization for the data channel; and transmitting, by the base transceiver station, a packet from the selected media sub-stream.

2. The method of claim 1, wherein, for each of the media sub-streams, the average data rate for the respective media sub-stream is updated in each timeslot, wherein updating the average data rate for the respective media sub-stream for a current timeslot comprises:

determining a previous average data rate determined in a previous timeslot for the media sub-stream;

determining a current transmission rate for the media sub-stream;

determining a latency value for the media sub-stream; and updating the average data rate for the media sub-stream using the previous average data rate, the current transmission rate, and the latency value.

3. The method of claim 1, wherein, for each media sub-stream, computing the utilization evaluation value for the media sub-stream comprises:

obtaining the data rate feedback information for the media sub-stream from each of the wireless terminals associated with the media sub-group associated with the media sub-stream;

computing an overall data rate control value for the media sub-stream using the data rate feedback information;

determining the average data rate for the media sub-stream; and computing the utilization evaluation value for the media sub-stream as a rate ratio of the overall data rate control value to the average data rate.

4. The method of claim 3, wherein computing the overall data rate control value comprises:

receiving a data rate control value from each of the wireless terminals associated with the media sub-group associated with the media sub-stream; and processing the data rate control values using a data rate control function to compute thereby the overall data rate control value.

5. The method of claim 4, wherein the data rate control function comprises one of a mean function or a minimum function.

6. The method of claim 1, wherein the available timeslot comprises a timeslot immediately subsequent to an occupied timeslot during which transmission of a previous packet ends.

7. The method of claim 1, further comprising:

receiving each of the media sub-streams from a gateway element adapted for processing a plurality of media streams to form the respective media sub-streams.

8. The method of claim 1, wherein the media sub-streams convey content conveyed by the respective media streams from which the media sub-streams are formed.

9. The method of claim 1, wherein the data rate feedback information is received at the base transceiver station in each timeslot, wherein the data rate feedback information comprises at least one data rate control value from each of the wireless terminals.

10. An apparatus for scheduling packet transmissions on a data channel of a base transceiver station serving a plurality of wireless terminals, wherein the base transceiver station supports a plurality of media sub-streams available for transmission toward the wireless terminals, wherein each of the media sub-streams is associated with a respective media sub-group having a plurality of wireless terminals associated therewith, the apparatus comprising:

means for updating a plurality of average data rates for the respective media sub-streams;

means for computing, for an available timeslot, a plurality of utilization evaluation values for the respective media sub-streams, wherein, for each media sub-stream, the utilization evaluation value for the media sub-stream is computed using data rate feedback information from wireless terminals associated with the media sub-group of the media sub-stream and the average data rate of the media sub-stream;

means for selecting one of the media sub-streams having an associated utilization evaluation value indicative of a best available channel utilization for the data channel; and means for transmitting a packet from the selected media sub-stream.

11. The apparatus of claim 10, wherein the means for updating is adapted for updating the average data rates for the respective media sub-streams during each timeslot, wherein the means for updating comprises:
   means for determining, for each of the media sub-streams, for a current timeslot, a previous average data rate determined in a previous timeslot for the media sub-stream;
   means for determining, for each of the media sub-streams, for a current timeslot, a current transmission rate for the media sub-stream;
   means for determining, for each of the media sub-streams, for a current timeslot, a latency value for the media sub-stream; and
   means for updating, for each of the media sub-streams, for a current timeslot, the average data rate for the media sub-stream using the previous average data rate, the current transmission rate, and the latency value of the media sub-stream.

12. The apparatus of claim 10, wherein the means for computing the utilization evaluation value for each media sub-stream comprises:
   means for obtaining, for each of the media sub-streams, data rate feedback information for the media sub-stream from each of the wireless terminals associated with the media sub-group associated with the media sub-stream;
   means for computing, for each of the media sub-streams, an overall data rate control value for the media sub-stream using the data rate feedback information;
   means for determining, for each of the media sub-streams, the average data rate for the media sub-stream; and
   means for computing, for each of the media sub-streams, the utilization evaluation value for the media sub-stream as a rate ratio of the overall data rate control value to the average data rate for the media sub-stream.

13. The apparatus of claim 12, wherein the means for computing the overall data rate control value comprises:
   means for receiving, for each of the media sub-streams, a data rate control value from each of the wireless terminals associated with the media sub-group associated with the media sub-stream; and
   means for processing, for each of the media sub-streams, the data rate control values using a data rate control function to compute thereby the overall data rate control value.

14. The apparatus of claim 13, wherein the data rate control function comprises one of a mean function or a minimum function.

15. The apparatus of claim 10, wherein the available timeslot comprises a timeslot immediately subsequent to an occupied timeslot during which transmission of a previous packet ends.

16. The apparatus of claim 10, further comprising:
   means for receiving each of the media sub-streams from a gateway element adapted for processing a plurality of media streams to form the respective media sub-streams.

17. The apparatus of claim 10, wherein the media sub-streams convey content conveyed by the respective media streams from which the media sub-streams are formed.

18. The apparatus of claim 10, wherein the data rate feedback information is received at the base transceiver station in each timeslot, wherein the data rate feedback information comprises at least one data rate control value from each of the wireless terminals.

19. A method for scheduling packet transmissions on a data channel of a radio access network (RAN) node serving a plurality of wireless terminals, wherein the RAN node supports a plurality of media sub-streams available for transmission toward the wireless terminals, wherein each of the media sub-streams is associated with a respective media sub-group having a plurality of wireless terminals associated therewith, the method comprising:
   updating a plurality of average data rates for the respective media sub-streams;
   computing, for an available timeslot, a plurality of utilization evaluation values for the respective media sub-streams, wherein, for each media sub-stream, the utilization evaluation value for the media sub-stream is computed using data rate feedback information from wireless terminals associated with the media sub-group of the media sub-stream and the average data rate of the media sub-stream;
   selecting one of the media sub-streams based on the utilization evaluation values of the respective media sub-streams; and
   transmitting a packet from the selected media sub-stream during the available timeslot.

20. A system, comprising:
   serving node for processing a plurality of media streams conveying content to form a plurality of media sub-streams conveying the content of the respective media streams from which the media sub-streams are formed;
   base transceiver station in communication with the serving node for receiving the media sub-streams and scheduling packet transmissions for the media sub-streams; and
   a plurality of wireless terminals in communication with the base transceiver station for receiving scheduled packet transmissions from the base transceiver station and providing data rate feedback information to the base transceiver station;
   wherein the base transceiver station schedules packet transmissions for the media sub-streams, wherein each of the media sub-streams is associated with a respective media sub-group having a plurality of wireless terminals associated therewith, wherein the base transceiver station schedules packet transmissions for the media sub-streams by:
   updating a plurality of average data rates for the respective media sub-streams;
   computing, for an available timeslot, a plurality of utilization evaluation values for the respective media sub-streams, wherein, for each media sub-stream, the utilization evaluation value for the media sub-stream is computed using data rate feedback information from wireless terminals associated with the media sub-group of the media sub-stream and the average data rate of the media sub-stream;
   selecting one of the media sub-streams having an associated utilization evaluation value indicative of a best available channel utilization for the data channel; and
   transmitting a packet from the selected media sub-stream.

* * * * *